D. F. FETTER.
DRIVE SCREW.
No. 110,839. Patented Jan. 10, 1871.
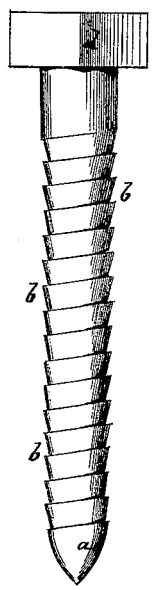
Witnesses:
Gustave Dieterich
[signature]
Inventor:
D. F. Fetter
per [signature]
Attorneys.

UNITED STATES PATENT OFFICE.

DAVID F. FETTER, OF NEW YORK, N. Y.

IMPROVEMENT IN DRIVE-SCREWS.

Specification forming part of Letters Patent No. 110,839, dated January 10, 1871.

*To all whom it may concern:*

Be it known that I, DAVID F. FETTER, of the city, county, and State of New York, have invented a new and Improved Wood-Screw; and I do hereby declare that the following is a full, clear, and exact description of the same, reference being had to the accompanying drawing, forming a part of this specification.

My invention has relation to an improvement in wood-screws; and it consists in the novel form of its parts, whereby it is rendered capable of being driven into wood without cutting the fibers thereof.

This drive-screw is so constructed that it can be driven into wood like a nail or spike, but is capable of being removed therefrom only by rotation on its axis. Its general form is that of an ordinary wood-screw, in that it has a head, a threaded shank, and a point.

$d$ represents the head of the screw, which may be circular and grooved, or square, or in any other of the usual forms. From its junction with the head the shank is usually made slightly tapering to the commencement of the curved surface of the point.

$b\ b$ represent the thread, which is of small pitch, and so formed that a section of it made by a plane passing through the axis of the shank will be nearly, if not quite, a right-angle triangle, having its base toward the head of the bolt; and the salient angular edge of the thread is designed to coincide with the imaginary conical surface which connects the larger end of the shank with the smaller end.

The point $a$ of the drive-screw is conoidal, and its surface is connected with the tapering wall of the last turn of the thread, at the smaller end of the shank, by a gradual curve. From this construction the screw, when driven into the wood, will part the fibers thereof, and will not cut or lacerate them, as is usual with sharp-pointed spikes. Therefore the fibers will readily and firmly close over the square upper shoulder of the thread and hold the screw to its place securely.

When it is desired to extract this drive-screw this may be readily accomplished by rotating it upon its axis, in the manner of extracting an ordinary screw.

Having thus described my invention, what I claim, and desire to secure by Letters Patent, is—

A drive-screw having an angular thread of the character shown, and a conoidal point, the base of which is of the same diameter as the lower end of the shank, with which it immediately connects.

The above specification of my invention signed by me this 17th day of August, 1870.

D. F. FETTER.

Witnesses:
GEORGE W. MABEE,
T. B. MOSHER.